United States Patent [19]

Ohta et al.

[11] Patent Number: 5,740,153
[45] Date of Patent: Apr. 14, 1998

[54] MAGNETO-OPTICAL DISK, OPTICAL PICKUP, AND MAGNETO-OPTICAL DISK DRIVE

[75] Inventors: Kenji Ohta, Kitakatsuragi-gun; Shigeo Terashima, Tenri; Akira Takahashi, Nara, all of Japan

[73] Assignee: Sharp Kabushiki Kaisha, Osaka, Japan

[21] Appl. No.: 801,245

[22] Filed: Feb. 19, 1997

Related U.S. Application Data

[63] Continuation of Ser. No. 267,453, Jun. 28, 1994, abandoned.

[30] Foreign Application Priority Data

Jun. 29, 1993 [JP] Japan ................................. 5-158871

[51] Int. Cl.$^6$ ..................................................... G11B 7/24
[52] U.S. Cl. .................................... 369/275.2; 369/13
[58] Field of Search ......................... 369/275.1, 275.2, 369/275.3, 32, 13, 116, 44.23, 44.24, 124, 112, 110, 109

[56] References Cited

U.S. PATENT DOCUMENTS

| | | | |
|---|---|---|---|
| 4,858,218 | 8/1989 | Takagi et al. | 369/275.2 |
| 5,031,162 | 7/1991 | Morimoto et al. | 365/275.2 |
| 5,150,339 | 9/1992 | Ueda et al. | 369/275.2 |
| 5,241,531 | 8/1993 | Ohno et al. | 369/275.2 |
| 5,272,684 | 12/1993 | Takeuchi et al. | 369/13 |
| 5,278,810 | 1/1994 | Takahashi et al. | 369/13 |
| 5,317,555 | 5/1994 | Takahashi et al. | 369/13 |
| 5,325,350 | 6/1994 | Morimoto et al. | 369/275.2 |
| 5,402,411 | 3/1995 | Maeda et al. | 369/275.2 |
| 5,414,652 | 5/1995 | Mieda et al. | 369/13 |
| 5,452,272 | 9/1995 | Murakami et al. | 369/13 |
| 5,554,436 | 9/1996 | Katayama et al. | 369/13 |

FOREIGN PATENT DOCUMENTS

| | | |
|---|---|---|
| A-0513668 | 11/1992 | European Pat. Off. . |
| 0 545 722 A1 | 6/1993 | European Pat. Off. . |
| A-3732874 | 4/1989 | Germany . |
| A-6427058 | 1/1989 | Japan . |
| A-2244445 | 9/1990 | Japan . |
| A-3216837 | 9/1991 | Japan . |
| A-449548 | 2/1992 | Japan . |

*Primary Examiner*—Nabil Hindi
*Attorney, Agent, or Firm*—David G. Conlin; George W. Neuner

[57] ABSTRACT

A magneto-optical disk including a transparent substrate, pit strings containing information formed in spiral or concentric form on a surface of the transparent substrate, a magneto-optical recording medium layer for covering the surface of the transparent substrate having the pit strings formed thereon, and magneto-optical recording areas formed by spiral or concentric flat portions between adjacent pit strings. An optical pickup for reproducing pit information and magneto-optically-recorded information from the magneto-optical disk. A magneto-optical disk drive for recording and reproducing information on the magneto-optical disk. The magneto-optical disk has a memory capacity which is twice the memory capacity of a conventional magneto-optical disk having ROM, and is accessed at high speeds.

8 Claims, 6 Drawing Sheets

5,740,153

MAGNETO-OPTICAL DISK, OPTICAL PICKUP, AND MAGNETO-OPTICAL DISK DRIVE

This application is a continuation of application Ser. No. 08/267,453 filed on Jun. 28, 1994, now abandoned.

FIELD OF THE INVENTION

The present invention relates to a magneto-optical disk on/from which information is recorded, reproduced and erased using light, an optical pickup for reading the information from the magneto-optical disk, and a magneto-optical disk drive for recording, reproducing and erasing information on the magneto-optical disk.

BACKGROUND OF THE INVENTION

Optical disk memory as high-density and high-capacity memory, such as a read-only CD (compact disk) and a magneto-optical disk which allows information recorded thereon to be rewritten, has already been on the market.

As illustrated in FIG. 9, read-only memory has minute pits 42 as permanent information created in spiral form on one of the surfaces of a transparent substrate 41 such PC (polycarbonate) and PMMA (acrylic) substrates. Such a disk having the pits allows the mass production of the same information.

On the other hand, as illustrated in FIG. 10, a magneto-optical disk has spiral guide grooves 52 on one of the surface of a transparent substrate 51, and a recording medium designed for use with a magneto-optical disk on the surface of the transparent substrate 51 whereupon the guide grooves 52 are formed. With this magneto-optical disk, signals are recorded on and reproduced from the recording medium. The location on which signals are to be recorded is either on the guide grooves 52 or lands 53 between the guide grooves 52 (if the width of the land 53 is larger than that of the guide groove 52 as shown in FIG. 10, signals are usually recorded on the lands 53). Since the recording medium is a film of a magnetic substance, it is possible to erase the recorded information and to record new information over the erased information. This is a significant characteristic of a magneto-optical disk.

A magneto-optical disk having both the characteristics of the rewritable disk and the disk containing only the permanent information is proposed. Such a disk with ROM (read-only memory) is divided into zones at a predetermined radius of the disk. For example, as illustrated in FIG. 11, a magneto-optical disk is divided into zone A where the permanent information is recorded in the form of pits and zone B where guide grooves are formed and rewritable information is recorded.

However, with the structure of the conventional magneto-optical disk with ROM, the ROM area where the permanent information is recorded and the magneto-optical memory area where information is rewritable are merely provided. Therefore, the volume of information recorded on the disk remains the same. Moreover, when reading the permanent information recorded in the ROM area and recording new information in the magneto-optical area according to the content of the information, it is necessary to move a light beam from the inner zone A toward the outer zone B.

In order to reproduce signal from an optical disk, generally, an optical pickup is required. As illustrated in FIG. 12, the optical pickup includes lens systems 72 and 77 for converging light 78 from a light source 71 such as a semiconductor laser, a photodetector 75 for reading information signals, a beam splitter 73 for directing reflected light from the disk to the photodetector 75, and a lens 74.

With this structure, however, since the weight of the optical pickup is increased, it takes at least several tens ms to move the optical pickup from the center portion of the optical disk toward the outer portion, resulting a linger access time to the information.

In short, the structure of the conventional magneto-optical disk with ROM suffers from the following drawbacks: the volume of information recorded on a single disk is the same as that recorded on a disk having only the ROM area or disk having only the magneto-optical area; and it takes a long time to access to the ROM area and the magneto-optical area by turns.

SUMMARY OF THE INVENTION

It is an object of the present invention is to provide a magneto-optical disk with ROM which has an increased memory capacity compared with a conventional disk and allows high-speed access.

In order to achieve the above object, a magneto-optical disk of the present invention includes: a transparent substrate; pit strings containing information recorded in spiral or concentric form on a surface of the transparent substrate; a magneto-optical recording medium layer for covering the surface of the transparent substrate having the pit strings formed thereon; and magneto-optical recording areas formed by spiral or concentric flat portions between adjacent pit strings.

Since the spiral or concentric flat portions between adjacent pit strings are arranged to be the magneto-optical recording areas, the memory capacity becomes double the capacity of a conventional magneto-optical disk with ROM.

It is another object of the present invention to provide an optical pickup capable of reproducing information recorded as pit strings and information which is magneto-optically recorded in a magneto-optical recording area of a magneto-optical disk.

In order to achieve the object, an optical pickup of the present invention includes: a light source; a beam splitter for transmitting a light beam from the light source to a magneto-optical disk and reflecting light from the magneto-optical disk; a polarization beam splitter for extracting two orthogonal polarized components from the reflected light from the beam splitter; two photodetectors for detecting the light intensity of the polarized components extracted by the polarization beam splitter; and means for outputting the sum of the outputs of the photodetectors as a readout signal when the light beam falls upon the pit strings on the magneto-optical disk and outputting the difference between the outputs of the photodetectors as a readout signal when the light beam falls upon a portion between the pit strings on the magneto-optical disk.

With this structure, it is possible to reproduce information recorded on the pit strings and magneto-optically-recorded information from the magneto-optical recording areas. It is thus possible to lower the level of crosstalk caused by the pit strings when reproducing the magneto-optically-recorded information. Moreover, since the area where the pit strings are formed and the magneto-optical recording area are arranged next to each other, it takes a short time to access either of the areas.

It is still another object of the present invention to provide a magneto-optical disk drive achieving high-speed access to the magneto-optical disk.

In order to achieve the above object, a magneto-optical disk drive of the present invention includes means for magneto-optically recording information in the magneto-optical recording area so that the frequency distribution of a reproduced signal obtained when the information recorded as the pit string is reproduced and the frequency distribution of a reproduced signal obtained when the magneto-optically-recorded information is reproduced from the magneto-optical recording area become substantially equal to each other.

With this structure, it is possible to access both the pit information and the magneto-optically-recorded information on the magneto-optical disk at high speeds.

For a fuller understanding of the nature and advantages of the invention, reference should be made to the ensuing detailed description taken in conjunction with the accompanying drawings.

DESCRIPTION OF THE PREFERRED EMBODIMENTS

The following description discusses one embodiment of the present information with reference to FIGS. 1 to 6.

Figure 1:
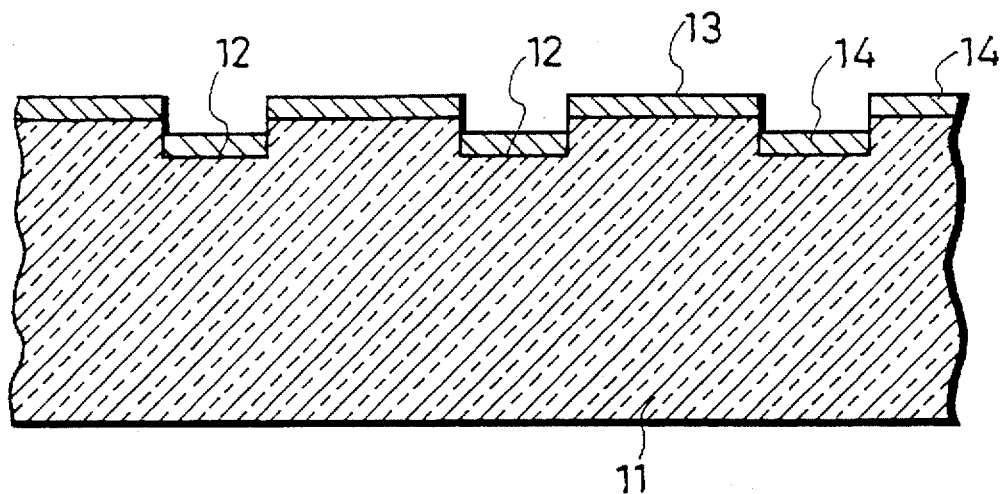
FIG. 1 is a vertical cross section showing a schematic structure of a magneto-optical disk of the present invention.

As illustrated in FIG. 1, a magneto-optical disk of this embodiment has a transparent substrate 11 such as glass, permanent information recorded on the transparent substrate 11 in the form of pits 12, a film of a magneto-optical recording medium 14 formed on the transparent substrate 11 after creating the pits 12, and a flat portion 13 as a magneto-optical recording area between adjacent pits 12. This magneto-optical disk is designed so that, if all the pit strings 12 and all the magneto-optical recording areas are arranged into a line respectively, the total length of the pit strings 12 and the total length of the magneto-optical recording areas are substantially equal to each other.

Figure 2:
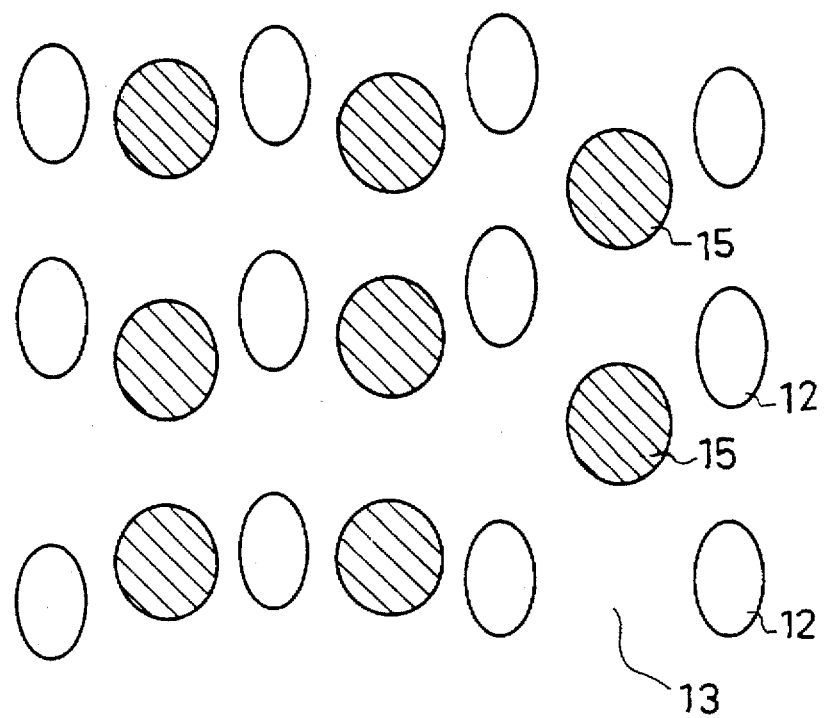
FIG. 2 is an explanatory view showing the allocation of pits and information (bits) on the magneto-optical disk of FIG. 1.

The magneto-optical disk shown in FIG. 2 has the pits 12 formed in spiral or concentric form on a surface thereof as shown in the drawing. Information (bits) 15 is magneto-optically recorded in the portions 13 as lands.

Figure 3:
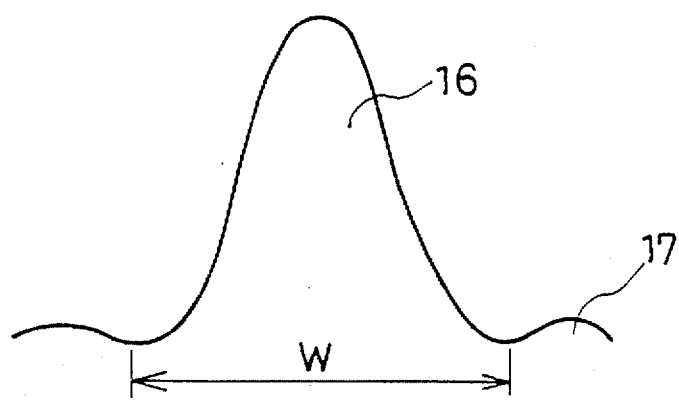
FIG. 3 is a graph showing the intensity distribution of a light beam spot on a magneto-optical recording medium of the magneto-optical disk of FIG. 1.

In this embodiment, the proportion of the width of the pit 12 to the width of the land is set about 1 to 3. The pitch of the strings of pits 12 (i.e., the distance between two successive strings of pits 12) is varied depending on the diameter of a light beam used for reproduction. FIG. 3 illustrates the intensity distribution of a converged light beam. In this embodiment, the pitch of the strings of pits 12 is arranged to be equal to a diameter W of a region of minimum light intensity between a main beam 16 and a first side lobe 17. With this arrangement, it is possible to lower the level of crosstalk which occurs when pit signals enter into the light beam during reproduction of the magneto-optical signals (i.e., information 15). The depth of the pit 12 is varied depending on the wavelength $\lambda$ of the reproduction-use light. Here, in order to satisfactorily reproduce information from the pits 12 and to lower the level of crosstalk, the depth of the pit 12 is set $\lambda/(10n)$, where n represents the refractive index of the transparent substrate 1.

Figure 10:
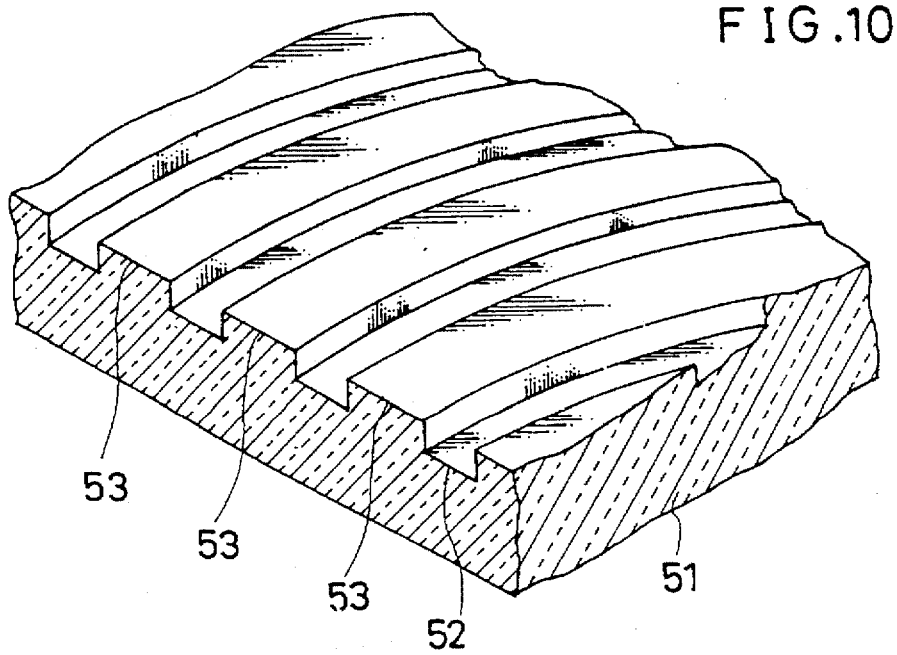
FIG. 10 is an explanatory view showing a schematic structure of a conventional magneto-optical disk.
Figure 11:
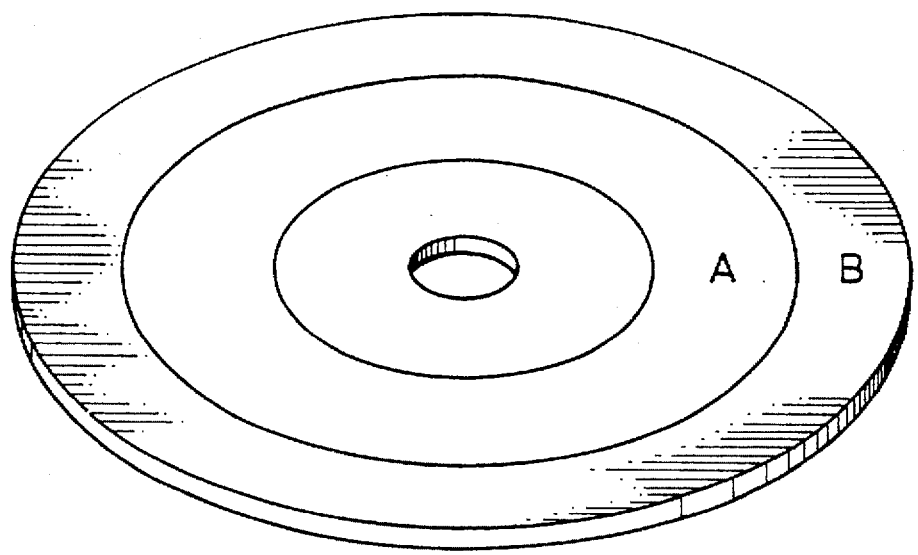
FIG. 11 is an explanatory view showing a schematic structure of a conventional magneto-optical disk with ROM.

In the case of a conventional magneto-optical disk, in order to lower the level of crosstalk between a track and adjacent tracks, each of which containing magneto-optically recorded information (for example, between a land portion 531 and adjacent land portions 532 shown in FIG. 10), the recording track pitch is designed so that the side lobe 17 of the light beam falls on the guide groove 52 in FIG. 10.

The distance between adjacent pits 12 on the magneto-optical disk of this embodiment was arranged to be equal to the conventional recording track pitch. When magneto-optical signals were reproduced from this disk, the level of crosstalk caused by adjacent pits 12 was improved by more than 10 dB compared with the level of crosstalk observed when magneto-optical signals were reproduced from an optical disk satisfying the relationship between the track pitch and the geometry of the light beam of the present invention.

The light beam having the side lobe 17 shown in FIG. 3 is produced by causing a light beam of a diameter larger than the numerical aperture of an objective lens to fall onto the objective lens. A plate for shutting off the light may be arranged on a portion of the objective lens on which the center portion of the light beam falls. Here, a circular metal film was formed on the center portion of the objective lens surface. The diameter of the metal film was one fifth of the aperture of the objective lens.

Figure 5:
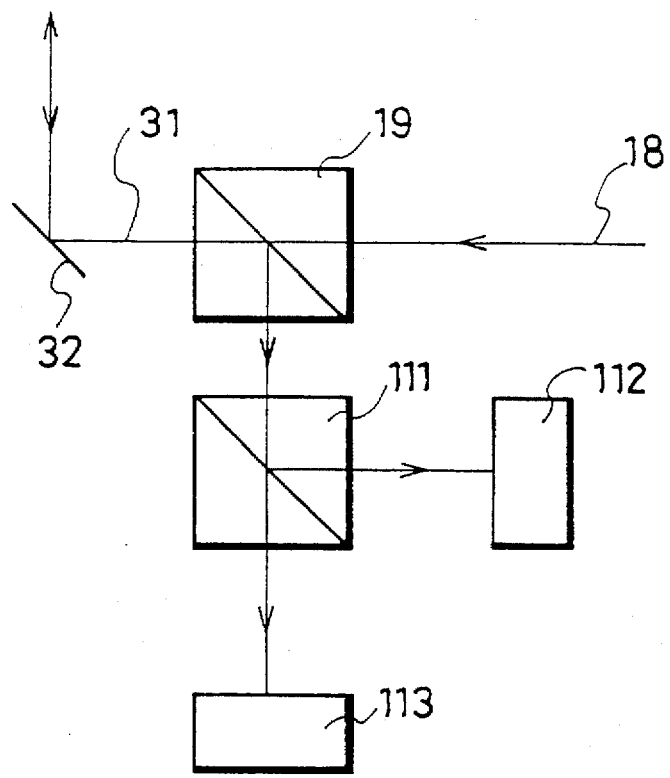
FIG. 5 is a view showing a schematic structure of an optical pickup for reproducing information from the magneto-optical disk of FIG. 1.

FIG. 5 shows part of the structure of an optical pickup used for reproducing signals recorded on the magneto-optical disk of this embodiment. Light 18 from a light source, not shown, passes through a beam splitter 19, is reflected by a mirror 32, and falls on a disk, not shown. Reflected light from the disk is reflected by the mirror 32, and its light path is changed by the beam splitter 19. The light is then divided into two light beams by a polarization beam splitter 111 which also functions as an analyzer, and falls on photodetectors 112 and 113, respectively.

When reproducing the information in the form of pits 12 by the light beam, a sum signal of the photodetectors 112 and 113 is used. When reproducing a magneto-optical signal from a portion between pits 12, a difference signal of the photodetectors 112 and 113 is used. With this structure, the level of crosstalk from the pits 12 observed when reproducing the magneto-optical signal was improved by at least 30 dB compared with the level of crosstalk observed when only the photodetector 112 was used. Moreover, when the level of the magneto-optical signal reproduced by the difference signal of the photodetectors 112 and 133 was divided by the signal level of the pits 12, the level of crosstalk in the resulting signal was improved by at least about 3 dB in comparison with the case where the difference signal was just used. Better results can be obtained by using this method together with a disk having a pitch of pit strings which was substantially equal to "W" shown in FIG. 3.

Another method of reproducing information from the magneto-optical disk of FIG. 1 is discussed below. In this method, a focus servo system was moved so that the reproduction-use beam forms an oval spot having a longer axis in a direction orthogonal to the direction of a pit string (i.e., to a track direction) on the recording medium when reproducing the string of pits 12, and forms an oval spot having a longer axis in a direction parallel to the track direction when reproducing the magneto-optical recording area. At this time, by incorporating the optical system of FIG. 6 into this structure, the level of crosstalk from the pits 12 was lowered when reproducing information from the magneto-optical recording area. Since the quality of signals obtained by reproducing the string of pits 12 was satisfactory. Therefore, if the total function of the drive is concerned, it is not necessary to focus the reproduction-use beam into an oval spot on the recording medium surface when reproducing the string of pits 12. It is rather important to focus the beam into an oval spot when reproducing the magneto-optically recorded information to lower the level of crosstalk.

Figure 4:
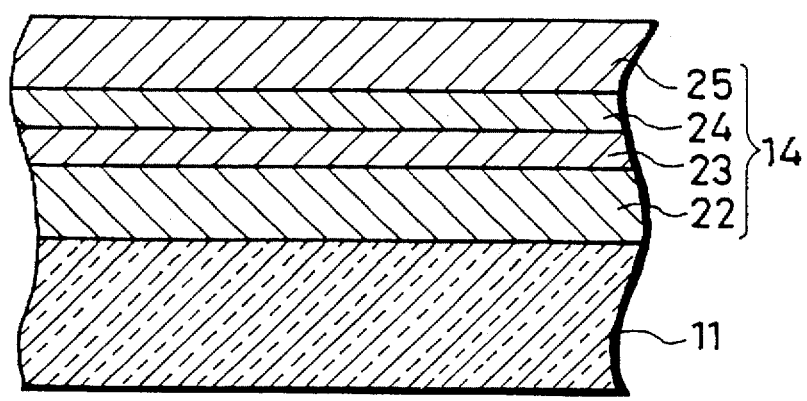
FIG. 4 is a vertical section showing one example of the magneto-optical recording medium of the magneto-optical disk of FIG. 1.

FIG. 4 shows an example of a magneto-optical recording medium 14 of the present invention. FIG. 4 shows the enlarged land portion 13 but not the strings of pits 12. The magneto-optical recording medium 14 is produced by forming a 80-nanometer-thick transparent dielectric film 22 made of tantalum oxide, a 30-nanometer-thick magnetic film 23 made of $Gd_{0.28}Fe_{0.57}Co_{0.15}$, a 30-nanometer-thick magnetic film 24 made of $Tb_{0.25}Fe_{0.60}Co_{0.15}$, and a 100-nanometer-thick film 25 made of tantalum oxide in this order on the transparent substrate 11. The magnetic film 23 shows in-plane magnetization from room temperature to 100° C., and perfect perpendicular magnetization at or above 120° C. The magnetic film 23 is provided for transferring the information (bits) 15 recorded on the magnetic film 24 during reproduction. The magnetic film 23 produces an effect of lowering the level of crosstalk caused by the adjacent recording tracks.

A combination of tantalum oxide and GdFeCo is particularly important in this structure. For example, the level of jitter during reproduction was lowered to or less than a half of the jitter level observed when SiN and AlN were used instead of tantalum oxide. More specifically, the level of jitter was 6 ns when signals of a uniform frequency and of a bit length of 120 ns were recorded and reproduced on/from the recording medium 14 of SiN/GdFeCo/TbFeCo/SiN. Whereas, the level of jitter was not greater than 3 ns when the composition of the recording medium 14 was tantalum oxide/GdFeCo/TbFeCo/SiN. At this time, tantalum oxide and GdFeCo were formed by high-frequency sputtering. Similarly, a satisfactorily lowered jitter level was observed when a combination of tantalum oxide/GdFeCo/TbFeCo/tantalum oxide was employed.

With the magneto-optical recording medium 14 of this structure, since the temperature of a region of the magneto-optical recording medium 14 exposed to the side lobe 17 of the light beam having the intensity distribution of FIG. 3 is not raised, the crosstalk of the magneto-optically recorded information is not observed, thereby significantly improving the quality of recorded information. More specifically, the level of crosstalk is improved by 5 to 10 dB compared with a conventional magneto-optical recording medium having a single magnetic film (for example, AlN/DyFeCo/AlN/Al). When the magneto-optical recording medium 14 of this structure was employed by the magneto-optical disk of the present invention, i.e., by the magneto-optical disk having strings of pits 12 whose pitch is equal to W of FIG. 3, the reproduction margin became larger.

Figure 6:
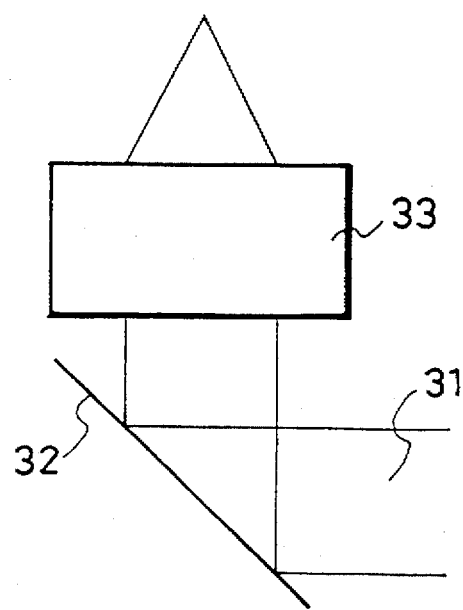
FIG. 6 is a explanatory view showing the vicinity of a converging lens of the optical pickup of FIG. 5.

FIG. 6 illustrates part of the structure of a pickup when a magneto-optical disk drive was constructed using the present invention. The light beam 31 is reflected by the mirror 32, and converged on the magneto-optical disk by an objective lens, not shown, mounted on an objective lens holder 33. The objective lens holder 33 performs tracking using an actuator, not shown.

Figure 12:
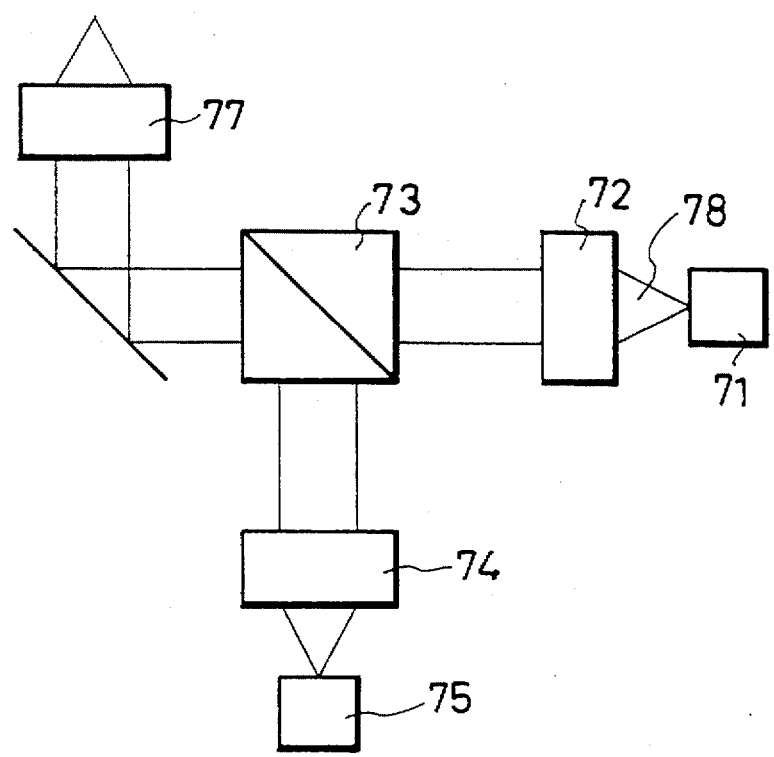
FIG. 12 is a view showing a schematic structure of an optical pickup for reproducing information from the magneto-optical disk with ROM of FIG. 11.

With the drive of the present invention, the permanent information recorded by the pits 12 is reproduced, and the necessary information corresponding to the permanent information is recorded on adjacent magneto-optical recording tracks. At this time, only the actuator provided for the objective lens is moved within a small range of a few µm (equivalent to a few tracks) without moving the whole body of the optical pickup shown in FIG. 12. Consequently, the access time for recording is shortened. The lens actuator may be formed by a spring and electromagnet in a conventional manner.

If such a pickup is used in a drive handling data compression such as MD (mini disk), music information recorded by the pits 12 is reproduced and another music information is magneto-optically recorded on adjacent tracks at the same time. Namely, the drive is used as a multi-channel system. Since the conventional magneto-optical disk with ROM is divided into a ROM zone and a magneto-optical recording zone, a large amount of time is wasted to move the optical pickup. Such a disk thus virtually prevents the drive from being used as the multi-channel system. Whereas, with the present invention, since the magneto-optical recording area has the same length as the ROM area, the capacity of the disk is increased by two times. With this structure, it is desirable that the frequency distribution of the information as the pit strings 12 and the frequency distribution of the magneto-optically recorded information 15 are substantially equal. Namely, if music information is recorded in the ROM area, information to be magneto-optically recorded is desired to be music information, or if image information is recorded in the ROM area, information to be magneto-optically recorded is desired to be image information.

An experiment was carried out by recording animated image information on a magneto-optical disk using the magneto-optical disk drive, a television (TV) monitor as an outputting device and a video camera as an inputting device and by reproducing the information using the TV monitor. Here, the magneto-optical disk of the present invention shown in FIG. 1 was used, graphic information was prerecorded as ROM information, and the graphic information was reproduced on the TV monitor and simultaneously magneto-optically recorded by the video camera. The magneto-optical disk drive has a buffer memory, and operates at a speed not lower than twice the speed of the maximum carrier frequency of the graphic information and image information. More specifically, the following system was built. With this system, an amount of the graphic information corresponding to a predetermined time is recorded in a half the space of the buffer memory at a speed not lower than a speed required by the TV monitor and is transmitted to the TV monitor at a uniform speed, while the image information is magneto-optically recorded in the remaining half space of the buffer memory by the video camera during an idling time of the magneto-optical disk drive. With this structure, the magneto-optical disk drive is used for two purposes: reproduction of the ROM information; and magneto-optical recording of the image information.

Figure 7:
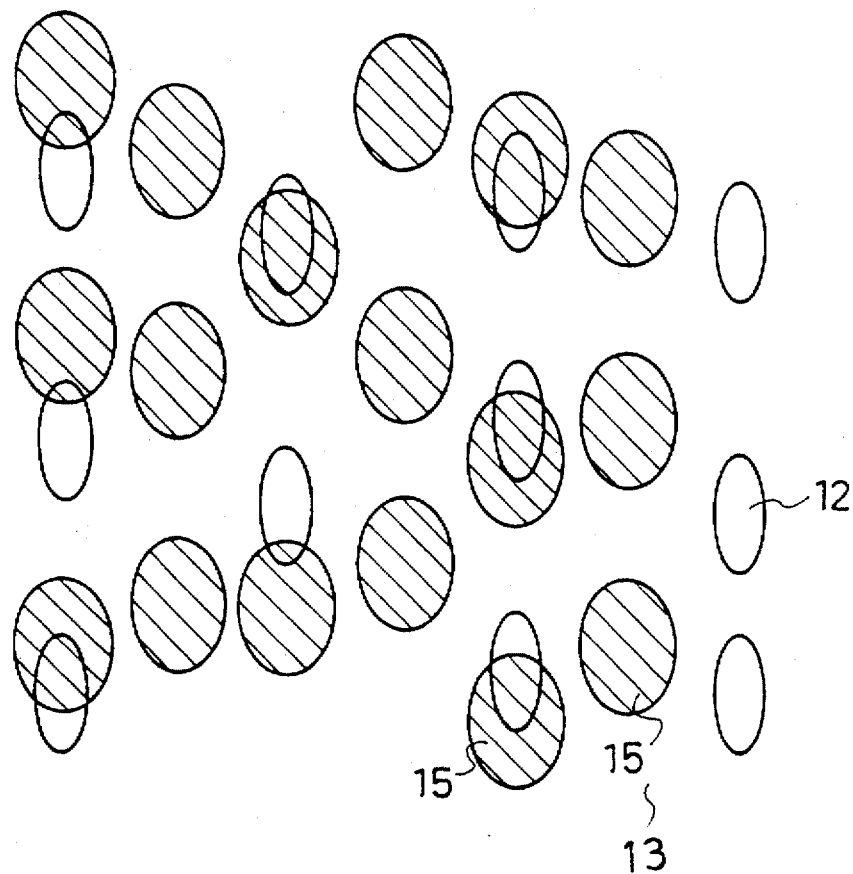
FIG. 7 is an explanatory view showing the allocation of pits and information (bits) on the magneto-optical disk of FIG. 1.

The following description discusses another embodiment of the present invention with reference to mainly FIGS. 7 and 8. The members having the same function as those shown in the drawings of the above-mentioned embodiment will be designated by the same code and their description will be omitted.

As illustrated in FIG. 7, with a magneto-optical disk of this embodiment, the information (bit) 15 is magneto-optically recorded not only on a track formed in a land portion 13 between pits 12 but also on a track on which the pits 12 are formed. The magneto-optical recording medium 14 has the structure described in the above-mentioned embodiment (see FIG. 4).

When reproducing the information from the track on which the pits 12 are formed, a pit signal was obtained by the sum signal of the photodetectors 112 and 113 (shown in FIG. 5), while a magneto-optical signal is obtained by the difference signal thereof. At this time, the information magneto-optically recorded on the track of the land portion 13 between the pits 12 is masked by the magnetic film 23 of GdFeCo, and therefore does not mix with a reproduced signal. It is thus possible to record double the quantity of information.

Figures 8A, 8B:
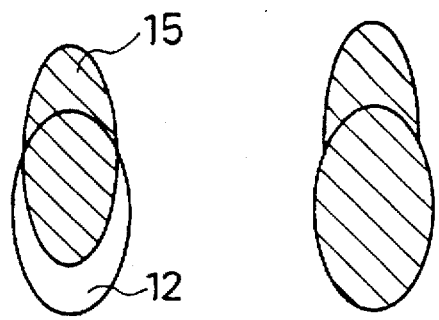
FIG. 8 is an explanatory view showing that information (bit) is recorded over the entire area of the pit when the width of the information (bit) is smaller than the width of the pit.
Figure 9:
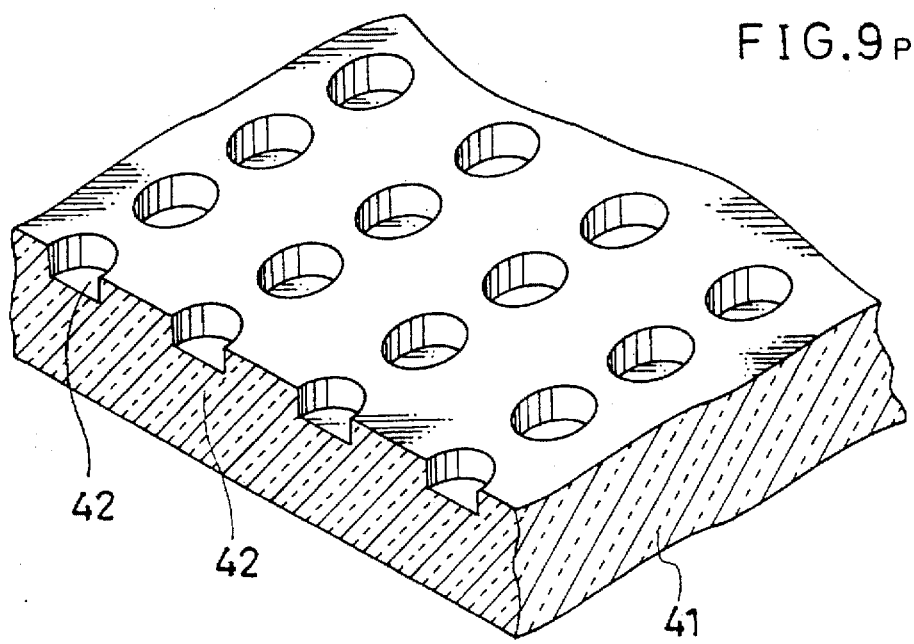
FIG. 9 is an explanatory view showing a schematic structure of a conventional read-only type optical disk.

At this time, care should be taken to the relationship between the width of the pit 12 and that of a bit to be magneto-optically recorded. Namely, it is necessary to make the width of the magneto-optically recorded bit (information 15) larger than the width of the pit 12 as shown in FIG. 7. When the width of the pit 12 was larger than that of the magneto-optically recorded bit, even though the bit was magneto-optically recorded on the pit 12 as shown in FIG. 8(a), the bit was magneto-optically recorded in the entire area of the pit 12 as shown in FIG. 8(b). As a result, the signal quality deteriorated and error was increased considerably.

As described above, the present invention enables the memory capacity of the optical disk to be increased by at least two times, the ROM information and the rewritable information to be used simultaneously and accessed at high speeds, and a single magneto-optical disk drive to be used as the multi-channel system.

The magnetic films 23 and 24 of the double-layer structure (see FIG. 4) of the magneto-optical recording medium 14 are formed by rare earth transition metal, for example, GdFeCo/TbFe and GdFeCo/DyFeCo. When the respective thicknesses were around 30 nm, for example, between 20 and 40 nm, favorable results were obtained. Needless to say, it is also possible to use the conventional four-layer structure, for example, AlN/DyFeCo/AlN/Al.

Furthermore, a resin substrate such as PC and PMMA may also be used as the transparent substrate 11.

As described above, the magneto-optical disk of the present invention includes the transparent substrate 11, the strings of pits 12 containing information formed in spiral or concentric form on the transparent substrate 11, the magneto-optical recording medium 14 covering the transparent substrate 11 having the strings of pits 12 thereon, and the magneto-optical recording area in the flat portion 13 between adjacent strings of pits 12.

With this structure, since the magneto-optical recording area of a length substantially equal to the length of the string of pits 12 is formed in the flat portion 13 between adjacent strings of pits 12, the memory capacity becomes double the capacity of a conventional magneto-optical disk with ROM.

An optical pickup of the present invention for reading information from the magneto-optical disk includes: a light source; a beam splitter 19 for transmitting light 18 from the light source to the magneto-optical disk and for reflecting light from the magneto-optical disk; a polarization beam splitter 111 for extracting two orthogonal polarized components from the reflected light from the beam splitter 19; and two photodetectors 112 and 113 for detecting the light intensity of the polarized components extracted by the polarization beam splitter 111. With this structure, when the light 18 falls upon the string of pits 12 on the magneto-optical disk, information is reproduced from the sum of the outputs of the photodetectors 112 and 113. On the other hand, when the light 18 falls upon a portion between the pit strings 12 on the magneto-optical disk, information is reproduced from the difference between the outputs of the photodetectors 112 and 113.

With this structure, it is possible to reproduce the information recorded as the string of pits 12, and the magneto-optically-recorded information from the magneto-optical recording area. It is thus possible to lower the level of crosstalk caused by the string of pits 12 when reproducing the magneto-optically-recorded information. Moreover, since the area where the stings of pits 12 is formed and the magneto-optical recording area are arranged next to each other, it takes a short time to access either of the areas.

In addition, a magneto-optical disk drive of the present information for recording and reproducing information on the magneto-optical disk, magneto-optically records information in a magneto-optical recording area so that the frequency distribution of a reproduced signal obtained when the information recorded as the string of pits 12 is reproduced and the frequency distribution of a reproduced signal obtained when the magneto-optically-recorded information is reproduced from the magneto-optical recording area become substantially equal to each other.

This structure achieves high-speed access device fully utilizing the characteristic of the magneto-optical disk.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical disk comprising:

a transparent substrate;

pit strings containing information recorded in spiral or concentric form on a surface of said transparent substrate;

a dielectric film formed on said transparent substrate;

a magneto-optical recording medium layer, formed immediate on said dielectric film, for covering the surface of said transparent substrate having said pit strings formed thereon, said magneto-optical recording medium layer including a first magnetic film layer, which shows in-plane magnetization at room temperature and perpendicular magnetization at a higher temperature, and a perpendicularly magnetized second film layer made of rare earth transition metal, formed on said first magnetic film layer; and magneto-optical recording areas formed by spiral or concentric flat portions between adjacent pit strings.

2. The magneto-optical disk according to claim 1, wherein:

said magneto-optical recording medium layer further includes a transparent dielectric film, which is made of tantalum oxide and is formed between said transparent substrate and said first magnetic film layer, and said first magnetic film layer is made of GdFeCo showing perpendicular magnetization at a temperature not lower than 100° C.

3. The magneto-optical disk according to claim 2, further comprising:

a film, made of SiN, formed on said perpendicularly magnetized second film layer; and wherein said perpendicularly magnetized second film layer is made of TbFeCo.

4. The magneto-optical disk according to claim 2, further comprising:

a film, made of tantalum oxide, formed on said perpendicularly magnetized second film layer; and wherein said perpendicularly magnetized second film layer is made of TbFeCo.

5. A magneto-optical disk comprising:

a transparent substrate;

pit strings containing information recorded in spiral or concentric form on a surface of said transparent substrate;

a dielectric film formed on said transparent substrate;

a magneto-optical recording medium layer, formed immediately on said dielectric film, for covering the surface of said transparent substrate having said pit strings formed thereon, said magneto-optical recording medium layer including: (i) a first magnetic film layer, which shows an in-plane magnetization from room temperature at 100° C. and a perpendicular magnetization at a temperature not lower than 100° C., and (ii) a perpendicularly magnetized second film layer, made of rare earth transition metal, formed on said first magnetic film layer; and magneto-optical recording areas formed by spiral or concentric flat portions between adjacent pit strings.

6. The magneto-optical disk according to claim 5, wherein:

said magneto-optical recording medium layer further includes a transparent dielectric film, which is made of tantalum oxide and is formed between said transparent substrate and said first magnetic film layer, and said first magnetic film layer is made of GdFeCo showing perfect perpendicular magnetization at a temperature not lower than 120° C.

7. The magneto-optical disk according to claim 6, further comprising:

a film, made of SiN, formed on said perpendicularly magnetized second film layer; and wherein said perpendicularly magnetized second film layer is made of TbFeCo.

8. The magneto-optical disk according to claim 6, further comprising:

a film, made of tantalum oxide, formed on said perpendicularly magnetized second film layer; and wherein said perpendicularly magnetized second film layer is made of TbFeCo.

* * * * *